(12) United States Patent
Ahmad et al.

(10) Patent No.: US 8,275,793 B2
(45) Date of Patent: Sep. 25, 2012

(54) TRANSACTION TRANSFORMS

(75) Inventors: Arshad F. Ahmad, Bellevue, WA (US);
Brad M. Olenick, Redmond, WA (US);
Clemens A. Szyperski, Redmond, WA
(US); David G. Hunt, Woodinville, WA
(US); Terry D. Zmrhal, Kirkland, WA
(US); Yuri Rychikhin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/360,456

(22) Filed: Feb. 23, 2006

(65) Prior Publication Data

US 2006/0248104 A1 Nov. 2, 2006

Related U.S. Application Data

(60) Provisional application No. 60/676,137, filed on Apr. 29, 2005, provisional application No. 60/703,220, filed on Jul. 28, 2005.

(51) Int. Cl.
*G06F 7/00* (2006.01)

(52) U.S. Cl. ........................................ 707/792; 715/234

(58) Field of Classification Search ................... 707/101, 707/792; 715/234
See application file for complete search history.

(56) References Cited

U.S. PATENT DOCUMENTS

| | | | |
|---|---|---|---|
| 4,943,932 A | 7/1990 | Lark et al. | 706/60 |
| 5,018,097 A | 5/1991 | Kuhlmann et al. | 719/313 |
| 5,392,430 A | 2/1995 | Chen et al. | 718/106 |
| 5,446,895 A | 8/1995 | White et al. | 717/101 |
| 5,491,813 A | 2/1996 | Bondy et al. | |
| 5,519,866 A | 5/1996 | Lawrence et al. | |
| 5,659,701 A | 8/1997 | Amit et al. | 719/317 |
| 5,790,855 A | 8/1998 | Faustini | 717/100 |
| 5,842,020 A | 11/1998 | Faustini | 717/111 |
| 5,940,828 A * | 8/1999 | Anaya et al. | 1/1 |
| 5,951,653 A | 9/1999 | Hill et al. | |
| 5,980,096 A | 11/1999 | Thalhammer-Reyero | |
| 6,083,276 A | 7/2000 | Davidson et al. | 717/107 |
| 6,205,465 B1 | 3/2001 | Schoening et al. | 718/102 |
| 6,208,336 B1 | 3/2001 | Carter | |
| 6,256,780 B1 | 7/2001 | Williams et al. | 717/5 |
| 6,272,675 B1 | 8/2001 | Schrab et al. | |
| 6,339,775 B1 | 1/2002 | Zamanian et al. | |
| 6,415,434 B1 | 7/2002 | Kind | 717/107 |

(Continued)

FOREIGN PATENT DOCUMENTS

JP 06-332711 12/1994

(Continued)

OTHER PUBLICATIONS

U.S. Office Action dated Sep. 20, 2007 cited in U.S. Appl. No. 11/360,454.

(Continued)

*Primary Examiner* — Thu Nga Nguyen
(74) *Attorney, Agent, or Firm* — Merchant & Gould (57) ABSTRACT

A method and system for maintaining isolated data in an application is disclosed which data to be selectively isolated until a data client orders the changes to be committed or abandoned. A computer-readable medium for constructing an application capable of localized data isolation is also disclosed. An application specification is used to determine which data entities should be isolated, and one or more transaction transforms are implemented for each data entity to be isolated.

13 Claims, 6 Drawing Sheets

U.S. PATENT DOCUMENTS

| | | | | |
|---|---|---|---|---|
| 6,601,233 | B1 | 7/2003 | Underwood | |
| 6,601,234 | B1 | 7/2003 | Bowman-Amuah | |
| 6,621,295 | B1 | 9/2003 | James-Roxby et al. | |
| 6,670,969 | B1 | 12/2003 | Halstead et al. | 715/762 |
| 6,721,941 | B1 | 4/2004 | Morshed et al. | |
| 6,721,951 | B1 | 4/2004 | Williams et al. | 719/329 |
| 6,760,903 | B1 | 7/2004 | Morshed et al. | |
| 6,820,135 | B1* | 11/2004 | Dingman et al. | 709/246 |
| 6,823,518 | B1* | 11/2004 | Bliss et al. | 719/310 |
| 6,983,464 | B1 | 1/2006 | Bhattacharya et al. | |
| 7,031,968 | B2 | 4/2006 | Kremer et al. | |
| 7,032,210 | B2* | 4/2006 | Alloing et al. | 717/106 |
| 7,043,481 | B2 | 5/2006 | Mullins et al. | |
| 7,103,873 | B2 | 9/2006 | Tanner et al. | |
| 7,131,107 | B2 | 10/2006 | Wall et al. | 717/105 |
| 7,206,827 | B2 | 4/2007 | Viswanath et al. | 709/220 |
| 7,233,982 | B2* | 6/2007 | Shenefiel | 709/219 |
| 7,240,327 | B2 | 7/2007 | Singh et al. | 717/108 |
| 7,269,650 | B2 | 9/2007 | Hamdan | |
| 7,280,996 | B2* | 10/2007 | Hayakawa et al. | 707/1 |
| 7,287,112 | B1 | 10/2007 | Pleis et al. | |
| 7,383,285 | B1* | 6/2008 | Pal et al. | 707/104.1 |
| 7,412,497 | B2 | 8/2008 | Viswanath et al. | 709/220 |
| 7,506,307 | B2 | 3/2009 | McCollum et al. | |
| 7,570,267 | B2 | 8/2009 | Patel et al. | |
| 7,574,690 | B2 | 8/2009 | Shah et al. | |
| 7,581,225 | B2 | 8/2009 | Ahmad et al. | 719/314 |
| 7,631,295 | B2 | 12/2009 | Makowski et al. | |
| 7,886,269 | B2 | 2/2011 | Williams et al. | |
| 8,046,737 | B2 | 10/2011 | Wittenberg et al. | |
| 8,132,148 | B2 | 3/2012 | Williams et al. | |
| 2002/0065950 | A1* | 5/2002 | Katz et al. | 709/318 |
| 2002/0069401 | A1 | 6/2002 | Wall et al. | |
| 2002/0095650 | A1 | 7/2002 | Green et al. | |
| 2002/0104068 | A1 | 8/2002 | Barrett et al. | |
| 2002/0188761 | A1 | 12/2002 | Chikirivao et al. | |
| 2003/0034998 | A1 | 2/2003 | Kodosky et al. | |
| 2003/0056200 | A1 | 3/2003 | Li et al. | |
| 2003/0063120 | A1 | 4/2003 | Wong et al. | |
| 2003/0135825 | A1* | 7/2003 | Gertner et al. | 715/513 |
| 2003/0192031 | A1* | 10/2003 | Srinivasan et al. | 717/120 |
| 2003/0204503 | A1 | 10/2003 | Hammer et al. | |
| 2003/0236925 | A1 | 12/2003 | Balek et al. | |
| 2004/0031018 | A1 | 2/2004 | Marty | 717/120 |
| 2004/0051739 | A1 | 3/2004 | Schmickley et al. | |
| 2004/0083238 | A1* | 4/2004 | Louis et al. | 707/200 |
| 2004/0083455 | A1 | 4/2004 | Gschwind et al. | 717/120 |
| 2004/0088685 | A1 | 5/2004 | Poznanovic et al. | |
| 2004/0158820 | A1* | 8/2004 | Moore et al. | 717/136 |
| 2004/0162985 | A1 | 8/2004 | Freeman et al. | |
| 2004/0163046 | A1 | 8/2004 | Chu et al. | |
| 2004/0181779 | A1* | 9/2004 | Gorti | 717/120 |
| 2004/0230666 | A1* | 11/2004 | Taboada et al. | 709/217 |
| 2004/0230945 | A1 | 11/2004 | Bryant et al. | |
| 2004/0250238 | A1 | 12/2004 | Singh et al. | 717/108 |
| 2005/0039162 | A1 | 2/2005 | Cifra | |
| 2005/0044235 | A1* | 2/2005 | Balahura et al. | 709/227 |
| 2005/0050515 | A1 | 3/2005 | Shah et al. | |
| 2005/0102615 | A1 | 5/2005 | Roman et al. | |
| 2005/0120275 | A1* | 6/2005 | Fletcher et al. | 714/38 |
| 2005/0135383 | A1* | 6/2005 | Shenefiel | 370/395.52 |
| 2006/0059461 | A1 | 3/2006 | Baker et al. | |
| 2006/0156294 | A1 | 7/2006 | Fuller et al. | |
| 2006/0168183 | A1 | 7/2006 | Fuller et al. | |
| 2006/0190105 | A1 | 8/2006 | Hsu et al. | |
| 2006/0225034 | A1 | 10/2006 | Peck et al. | |
| 2006/0245096 | A1 | 11/2006 | Ahmad et al. | |
| 2006/0247936 | A1 | 11/2006 | Khusial et al. | |
| 2006/0248112 | A1 | 11/2006 | Williams et al. | |
| 2006/0248448 | A1* | 11/2006 | Williams et al. | 715/513 |
| 2006/0248449 | A1 | 11/2006 | Williams et al. | |
| 2006/0248450 | A1 | 11/2006 | Wittenberg et al. | |
| 2006/0248451 | A1 | 11/2006 | Szyperski et al. | |
| 2006/0248467 | A1* | 11/2006 | Elvanoglu et al. | 715/744 |
| 2006/0248530 | A1 | 11/2006 | Ahmad et al. | |
| 2006/0253830 | A1 | 11/2006 | Rajanala et al. | |
| 2006/0277201 | A1* | 12/2006 | Dorsett | 707/10 |
| 2007/0150859 | A1 | 6/2007 | Kodosky et al. | |
| 2007/0247525 | A1 | 10/2007 | Samarasekera et al. | |
| 2008/0046885 | A1 | 2/2008 | Shultz et al. | |
| 2008/0263549 | A1* | 10/2008 | Walker | 718/100 |
| 2010/0306735 | A1 | 12/2010 | Hoff et al. | |

FOREIGN PATENT DOCUMENTS

| | | |
|---|---|---|
| JP | 09-062733 | 3/1997 |
| JP | 2001-38796 | 11/2001 |
| JP | 2004-227359 | 8/2004 |
| JP | 2004-258809 | 9/2004 |
| JP | 2004-280821 | 10/2004 |
| JP | 2004-334896 | 11/2004 |
| JP | 2004-350291 | 12/2004 |
| JP | 2005-043962 | 2/2005 |

OTHER PUBLICATIONS

International Search Report dated Apr. 26, 2007 cited in International Application No. PCT/US06/15184.

Chamberlin et al., "Quilt: An XML Query Language for Heterogeneous Data Sources", 2001, Springer Verlag Berlin Heidelberg, pp. 1-25.

Chinese First Office Action dated Aug. 21, 2009 cited in Application No. 200680014618.7.

Chinese Second Office Action dated Apr. 13, 2010 cited in Application No. 200680014637.X.

Chinese Office Action dated May 6, 2010 cited in Application No. 200680014594.5.

Russian Office Action dated Jun. 29, 2010 cited in Application No. 2007139779.

U.S. Final Office Action dated Aug. 16, 2010 cited in U.S. Appl. No. 11/360,851.

U.S. Final Office Action dated Aug. 20, 2010 cited in U.S. Appl. No. 11/360,857.

U.S. Final Office Action dated Aug. 23, 2010 cited in U.S. Appl. No. 11/360,455.

U.S. Final Office Action dated Aug. 30, 2010 cited in U.S. Appl. No. 11/360,457.

Georg Sonneck et al., "Optimized One-to-One Personalization of Web Applications using a Graph Based Model," Source: IEEE, dated: Apr. 22, 2003, 8 pgs.

U.S. Final Office Action dated Oct. 1, 2010 cited in U.S. Appl. No. 11/360,856.

Russian Official Action dated Jan. 15, 2010 cited in Application No. 2007139779/09.

U.S. Office Action dated Mar. 8, 2010 cited in U.S. Appl. No. 11/360,457.

U.S. Office Action dated Mar. 9, 2010 cited in U.S. Appl. No. 11/360,448.

U.S. Office Action dated Mar. 16, 2010 cited in U.S. Appl. No. 11/360,851.

U.S. Office Action dated Mar. 24, 2010 cited in U.S. Appl. No. 11/360,857.

U.S. Office Action dated Mar. 30, 2010 cited in U.S. Appl. No. 11/360,455.

Chinese Second Office Action dated Nov. 17, 2010 cited in Application No. 200680014594.5.

Chinese First Office Action dated Sep. 14, 2010 cited in Appl. No. 200680014092.2.

Osamah A. Rawashdeh et al., "A Technique for Specifying Dynamically Reconfigurable Embedded Systems," source: IEEE, Mar. 5, 2005, pp. 1-11.

Roel Wuyts et al., "Applying Experiences with Declarative Codifications of Software Architectures on COD," 2001, 11 pgs., <URL:http://docs.google.com/viewer?a=v&q=cache:gTwc64my JS4J:citeseerx.ist.psu.edu/viewdoc/download%3Fdoi%3D10.1. 1.23.4788%26rep^Drep1%26type%3Dpdf+instantiate+UI+>.

Bernhard Schätz, "Formalization and Rule-Based Transformation of MEF Ecore-Based Models," retrieved on Jun. 2, 2011, 19 pgs., <URL:http://www.fortiss.org/fileadmin/user_upload/FB1/Schaetz/SLE08-RuleBased.pdf>.

Chinese Second Office Action dated Jun. 9, 2011 cited in Application No. 200680014092.2.

European Supplemental Search Report dated Jul. 6, 2011 cited in Application No. 06769872.0.

European Supplemental Search Report dated Jul. 21, 2011 cited in Application No. 06758479.7.
European Supplemental Search Report dated Aug. 2, 2011 cited in Application No. 06758480.5.
European Supplemental Search Report dated Aug. 2, 2011 cited in Application No. 06751026.3.
Chinese Third Office Action dated Aug. 8, 2011 cited in Application No. 200680014594.5.
Russian Official Action dated Nov. 12, 2010 cited in Application No. 2007139779/08.
Copending U.S. Appl. No. 13/410,383, filed Mar. 2, 2012 entitled "XML Application Framework".
Japanese Notice of Rejection dated Feb. 7, 2012 cited in Application No. 2008-508960, 6 pgs.
Zoltán Benedek, "A Framework Built in .NET for Embedded and Mobile Navigation Systems", .NET Technologies 2004 workshop proceedings, http://dotnet.zcu.cz/NET_2004/Papers/C05.pdf, 8 pgs.
Japanese Notice of Rejection dated Nov. 25, 2011 cited in Application. No. 2008-508957, 13 pgs.
Shingo Nakagawa et al., "A Development System for Resource-Oriented Applications," Computer Software, vol. 20, No. 5, pp. 20-31, Japan Society for Software Science and Technology, Japan, Sep. 25, 2003 (partial translation as discussed in JP Notice of Rejection).
Japanese Notice of Rejection dated Nov. 25, 2011 cited in Application No. 2008-508958, 9 pgs.
Japanese Notice of Rejection dated Dec. 6, 2011 cited in Appiication No. 2008-508959, 12 pgs.
U.S. Office Action dated Dec. 21, 2011 cited in U.S. Appl. No. 11/360,856, 29 pgs.
Chinese Decision on Rejection dated Jan. 6, 2012 cited in Application No. 200680014092.2, 10 pgs.
U.S. Office Action dated Jan. 20, 2012 cited in U.S. Appl. No. 11/360,455, 32 pgs.
Japanese Notice of Final Rejection dated Mar. 16, 2012 cited in Application No. 2008-508957, 9 pgs.
Japanese Notice of Final Rejection dated Apr. 20, 2012 cited in Application No. 2008-508958, 4 pgs.
Chinese Fourth Office Action dated Apr. 24, 2012 cited in Application No. 200680014594.5, 7 pgs.

* cited by examiner

TRANSACTION TRANSFORMS

CROSS-REFERENCE TO RELATED APPLICATIONS

This patent application claims priority to U.S. Patent Application Ser. No. 60/676,137 filed Apr. 29, 2005 and entitled "Application Description Language," and U.S. Patent Application Ser. No. 60/703,220 filed Jul. 28, 2005 and entitled "Markup Language Based Application Framework with Application Description Language, Concurrency Domains, Application Framework Phasing Models, and Application Framework Transaction Transforms", the disclosures of which are expressly incorporated herein, in their entirety, by reference.

This patent application is also related to and filed concurrently with U.S. patent application Ser. No. 11/360,454, entitled "Multithreading with Concurrency Domains," U.S. patent application Ser. No. 11/360,455, entitled "Application Framework Phasing Model," U.S. patent application Ser. No. 11/360,457, entitled "XML Application Framework," and U.S. patent application Ser. No. 11/360,856, entitled "Application Description Language," which are assigned to the same assignee as the present application and expressly incorporated herein, in their entirety, by reference.

BACKGROUND

When constructing an application, a software developer typically creates the software components by writing "imperative code" using a development language, such as C#. In creating the imperative code, i.e., the software code that gives the software component its function, the developer must create links between all the components through calls or other constructs. For any functionality provided by an application, the software developer generally creates the code for all the different software components that perform the application specific functions and manually codes the interconnections between the software components that rely on each other to complete tasks. The software developer creates user interfaces, data constructs, and all the required operations for the interactions between the user and the application.

In most applications, the user interface, operations, and data constructs are application-specific. Thus, to create an application, a software developer typically creates a significant amount of code to implement the specific user interface, operations and/or other constructs. In addition, the software developer generally organizes and creates all the interrelationships between the different pieces of software. As a result, to create any application, a software developer must be significantly skilled in using the underlying languages used to create applications.

A particularly complex application development issue arises in dealing with transactions. Transactions relate to the communication (and typically the transfer of data) between a client and a server, or, as contemplated herein, a data client and a data store, where a data client is a UI element that allows access to data in one or more data stores. Applications for manipulating such data through transactions frequently make use of "atomic" transactions. An atomic transaction is a set of operations that follow an "all or nothing" principle, in which either all of the operations are successfully executed, or none of them is executed. For example, in a system for performing money transfers, information must be guaranteed to be fully updated. If funds are transferred between two accounts, one account cannot be credited if the other is not debited by the same amount. Recording the credit, and recording the corresponding debit therefore require atomic, "all or nothing" committal of the operations.

Previously, in order to perform an atomic transaction, typical applications relied on a two-phase commit model. In such a case, data is held/buffered temporarily for committal. During the first phase, assurances are sought that the buffered data can be committed atomically to all data stores that hold the data. In the second phase, if assurances are received, then all data stores that hold the data will commit the changes. If one or more of the data stores are not able to commit, then the operation is aborted, and the updates in the data view are lost, where the data view is a type of data client that provides read and/or write access to data in a database. Losing such data forces the user to re-enter the data, wasting time and resources.

It is with respect to these considerations and others that the present invention has been made.

SUMMARY

This summary is provided to introduce a selection of concepts in a simplified form that are further described below in the Detailed Description. This summary is not intended to identify key features or essential features of the claimed subject matter.

In accordance with the present invention, a computer-implemented method is provided for maintaining isolated data in an application. Data is received, along with a request to perform a control operation relating to the data. The control operation is performed, and status information pertaining to the data and the control operation is updated.

In accordance with other aspects, the present invention relates to a computer readable medium accessible to a computing system and encoding a computer program for constructing an application capable of localized data isolation. An application specification is received, one or more data entities requiring isolation are identified, and one or more transaction transforms are implemented for each data entity.

In accordance with yet other aspects, the present invention relates to a system for data isolation in an application. A control module performs a variety of control operations. A buffer module stores buffered data, and maintains status information relating to the buffered data and to the control operations. Optionally, a policy module allows further refinement of buffering and/or performance of control operations.

These and various other features as well as advantages, which characterize the present invention, will be apparent from a reading of the following detailed description and a review of the associated drawings.

DETAILED DESCRIPTION

Figure 1:
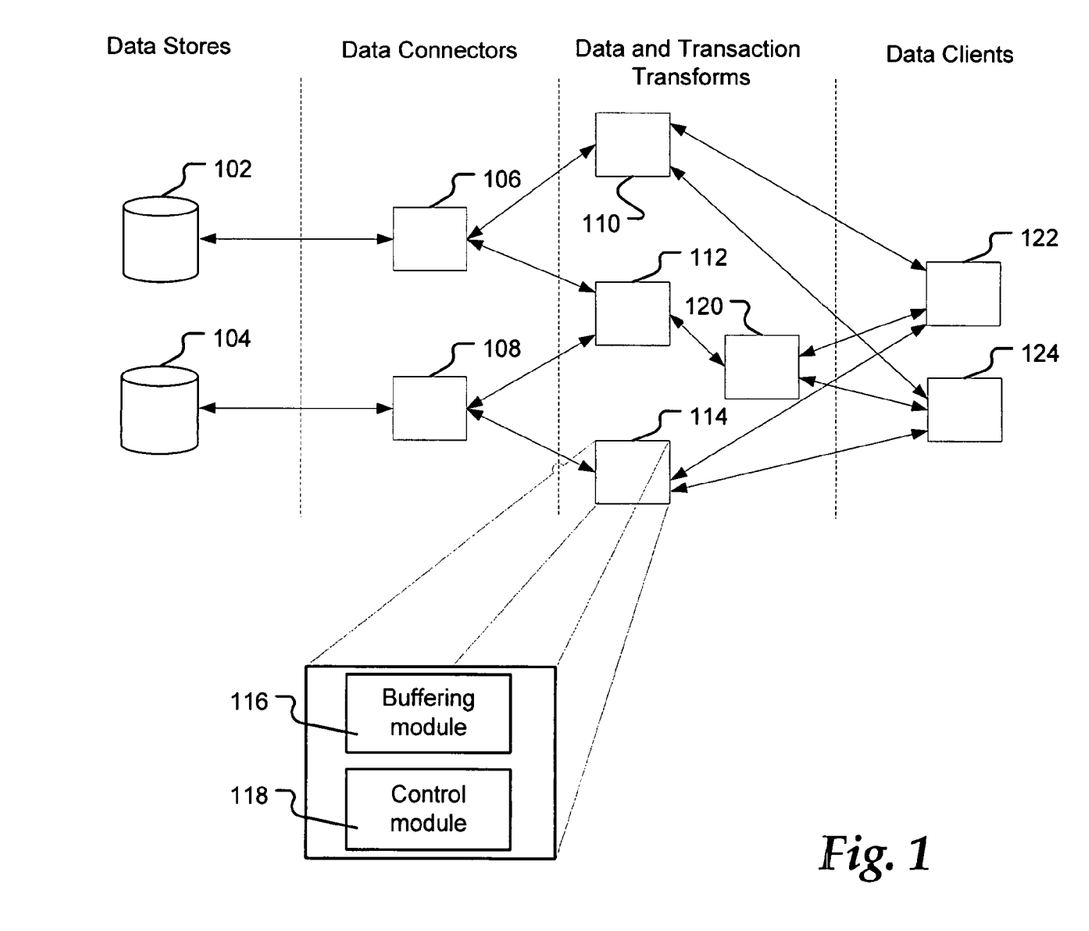
FIG. 1 illustrates an example of an application environment in which an embodiment of the present invention has been implemented.

Data in a data client may be selectively isolated from data stores through the use of one or more "transaction transforms." FIG. 1 illustrates an example of an application environment in which a transaction transform 114 has been implemented. Transaction transform 114 includes a buffering module 116 to store isolated data and status information regarding the data and control module 118 which uses a two-phase commit protocol in conjunction with buffer module 116 such that a failed commit need not result in data loss. Buffering module 116 and control module 118 are discussed in more detail below.

Data stores 102 and 104 contain data on a database server or on a computer-readable medium. Data may be read from and written to a data store. A check or some other request may be sent by an agent connected to a given data store to see if writing data to the data store is possible. If writing the data is possible, a positive indication is passed back to the agent. Likewise, if writing the data is not possible or not known to be possible, a negative indication is passed back to the agent.

Data connectors 106 and 108 connect data transforms 110, 112 and 114 to data stores 102 and 104. In an embodiment, protocols are implemented within data connectors 106 and 108 for dealing with one or more types of data stores. Each protocol handles one or more types of data store such as a database file encoded using a particular format. Data connector protocols atomically commit data modifications or changes received from data clients 122 and 124.

In one embodiment, data connectors 106 and 108 achieve atomicity by way of pessimistic concurrency. Pessimistic concurrency involves locking subsets of data (e.g., one or more records) at a data store to prevent a client from modifying data in a way that affects other clients. In a pessimistic concurrency model, when a client performs an action that causes a lock to be applied, other clients cannot perform actions that would conflict with the lock until the client that owns the lock releases the lock. This model is useful in environments where there may be heavy contention for data, and/or where the cost of protecting data with locks is less than the cost of rolling back transactions if concurrency conflicts occur. Pessimistic concurrency is best used when lock times will be short, such as in programmatic processing of records.

In another embodiment, data connectors 106 and 108 achieve atomicity using optimistic concurrency with compensation actions. Optimistic concurrency does not make use of locks. When a first client needs to update a record, the protocol determines whether another client has changed the record since it was last read by the first client. Optimistic concurrency is useful in environments with little data contention. A compensating action is an action that compensates for the effects of a transaction. For example, the compensating effect for a bank transfer of funds from account A to account B is the transfer of the same amount of funds from account B back to account A. Similarly, the compensating action for reserving a hotel room would be the cancellation of the reservation. Compensating actions allow a transaction to be "rolled back," or backed out with no lingering side effects or other negative consequences. A compensating action may be used to roll back a transaction when a conflict between two clients arises (e.g., a first client reads a data value, and then a second client modifies the data value before the first client has attempted to modify the value). In an embodiment, data connectors 106 and 108 cache data from data stores 102 and 104, respectively. If data requested by a data client is cached by a data connector, the corresponding data store need not be queried for the requested data. Data connectors are discussed in more detail below, in conjunction with FIG. 3.

Data transforms 110, 112, 114, and 120 encode and/or decode data according to predefined rules. Data transforms 110, 112, 114, and 120 implement functions that can perform arbitrarily complex processing. Data transforms 112 and 120 are in series with one another. Because of this, the results of the function implemented by data transform 112 are used as input to the function implemented by data transform 120 or vice versa. In an embodiment, data transforms may be serially connected to buffer the results of previous transforms, and allow complex functions to be implemented more easily and modularly. Likewise, subsets of data within a view can be committed or refreshed (see below) without affecting the remainder of the data in the view.

Data transform 114 is a special kind of data transform known as a transaction transform, and as such, contains a buffering module 116 and a control module 118. In an embodiment, a transaction transform allows isolated data to be committed atomically and in such a way that data is consistent between data stores. Buffering module 116 holds isolated data from data clients 122 and 124. In an example, data clients 122 and 124 are dialog boxes for editing data in data store 104. Edits made to the data may be stored in buffering module 116 substantially as the edits are made. In another embodiment, transaction transforms map edit requests against their output back to edit requests against their input(s). As a result, when edits are made, the input/requesting entity recognizes such an edit as complete. Further, these transaction transforms use their buffer 116 to enable delayed and controlled mapping of such edits, as discussed below.

Several types of control operations may be performed by a transaction transform. When a user wishes to commit the data in data client 122 or data client 124 (e.g., when an "Apply" button associated with a data client is activated), control module 118 receives a commit control operation from that data client and attempts to commit data using the two-phase concurrency protocol discussed below, in conjunction with FIG. 6. In an embodiment, buffered data in buffering module 116 may be deleted once it has been successfully committed. When a user wishes to refresh the data in the buffer (and thus, the data displayed in a corresponding data client), control module 118 receives a refresh control operation from that data client, and refreshes the data in buffering module 116. The refreshed data is propagated to the data client so that the user may access the updated data. The ability to refresh the isolated data may be used in place of aborting a commit in a traditional two-phase concurrency model, as discussed below in conjunction with FIG. 6.

In some situations, it is beneficial to update the data in a buffer without destroying uncommitted changes one or more users have made using one or more data clients. In such a case, a synchronize control operation may be issued by the data client. When control module 118 receives a synchronize control operation from a data client, the isolated data in buffering module 116 is updated based on the latest version in the data store(s), and the uncommitted changes to the isolated data are merged with the updated data. The process of synchronization of two or more sets of changes to data is well understood in the art, and synchronization may be used in a variety of circumstances. The details of how synchronization may be implemented in a given context are quite specific to that context. For example, in the context of a product database, it may be acceptable to merge a line of products in the database, but not acceptable to merge two versions of changes to a product's name. Other contexts may have other rules for synchronization, any and all of which may be used in conjunction with the present invention. Resolving conflicts is also known. Predetermined rules may be provided and followed as to which updates should govern in case of a conflict. Other embodiments may alert the user(s) to resolve such conflicts.

Buffering module 116 maintains status information that may vary based on the type of operation currently in progress. For example, if a commit is in progress, status information may include whether the commit is pending, was successful, or failed. Alternatively, if a refresh is in progress, status information may include whether the refresh is pending, or complete. If a synchronization operation is in progress, status information may include whether the synchronization is pending, was successful, or failed. The specific control operations are discussed in more detail below, in conjunction with FIGS. 5 and 6.

Some data accessible to a data client may not require isolation. For example, alterations to a financial database (such as that used to track bank accounts) are typically committed immediately. In an embodiment, a given data view may include both isolated and non-isolated data. In another embodiment, a given data client may include read-only data that may not be edited within the data client.

Other embodiments are also envisioned. In one embodiment, the present invention may be used in conjunction with phases and domains to constrain ordering of operations. Phases and domains are explained in related applications Ser. No. 11/360,455, entitled "Application Framework Phasing Model," and Ser. No. 11/360,454, entitled "Multithreading with Concurrency Domains," both applications having been assigned to Microsoft® Corporation; and incorporated by reference herein in their entirety.

Figure 2:
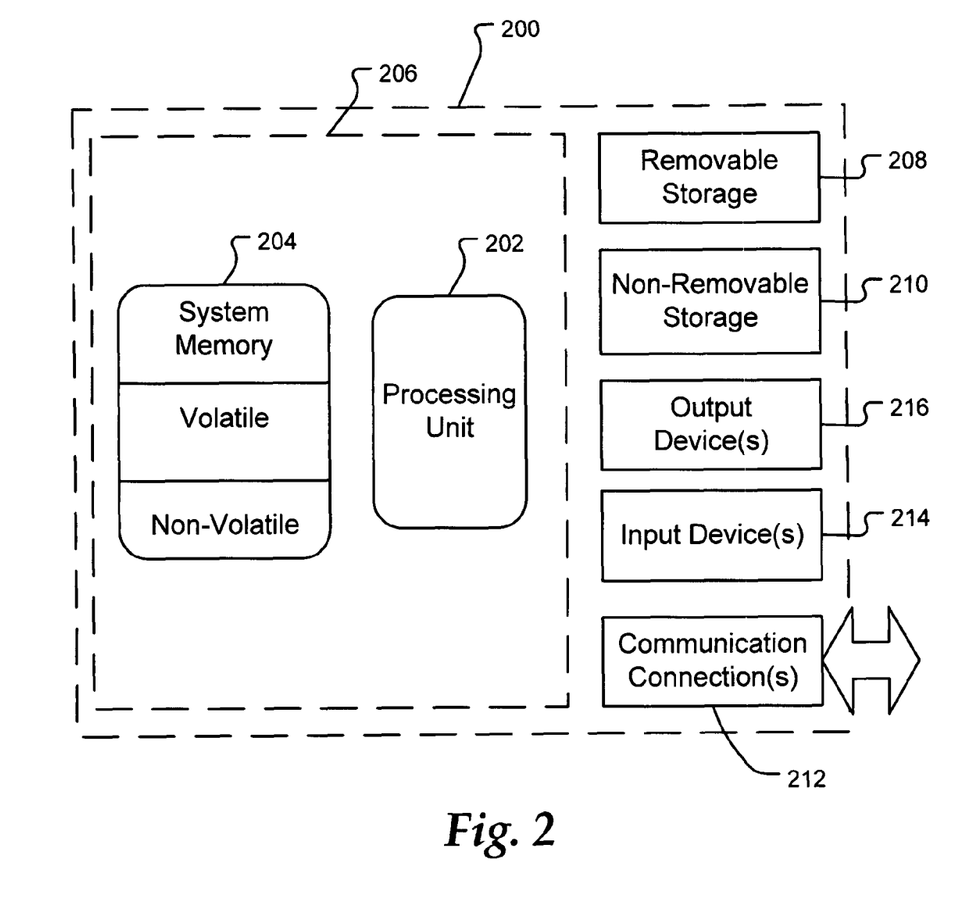
FIG. 2 illustrates an example of a suitable computing system environment on which an embodiment of the present invention may be implemented.

Given that the present invention may be implemented as a computer system, FIG. 2 is provided to illustrate an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, devices such as displays, speakers, and printers. For the purposes of this invention, the display is a primary output device. Each of these devices is well know in the art and, therefore, not described in detail herein.

Figure 3:
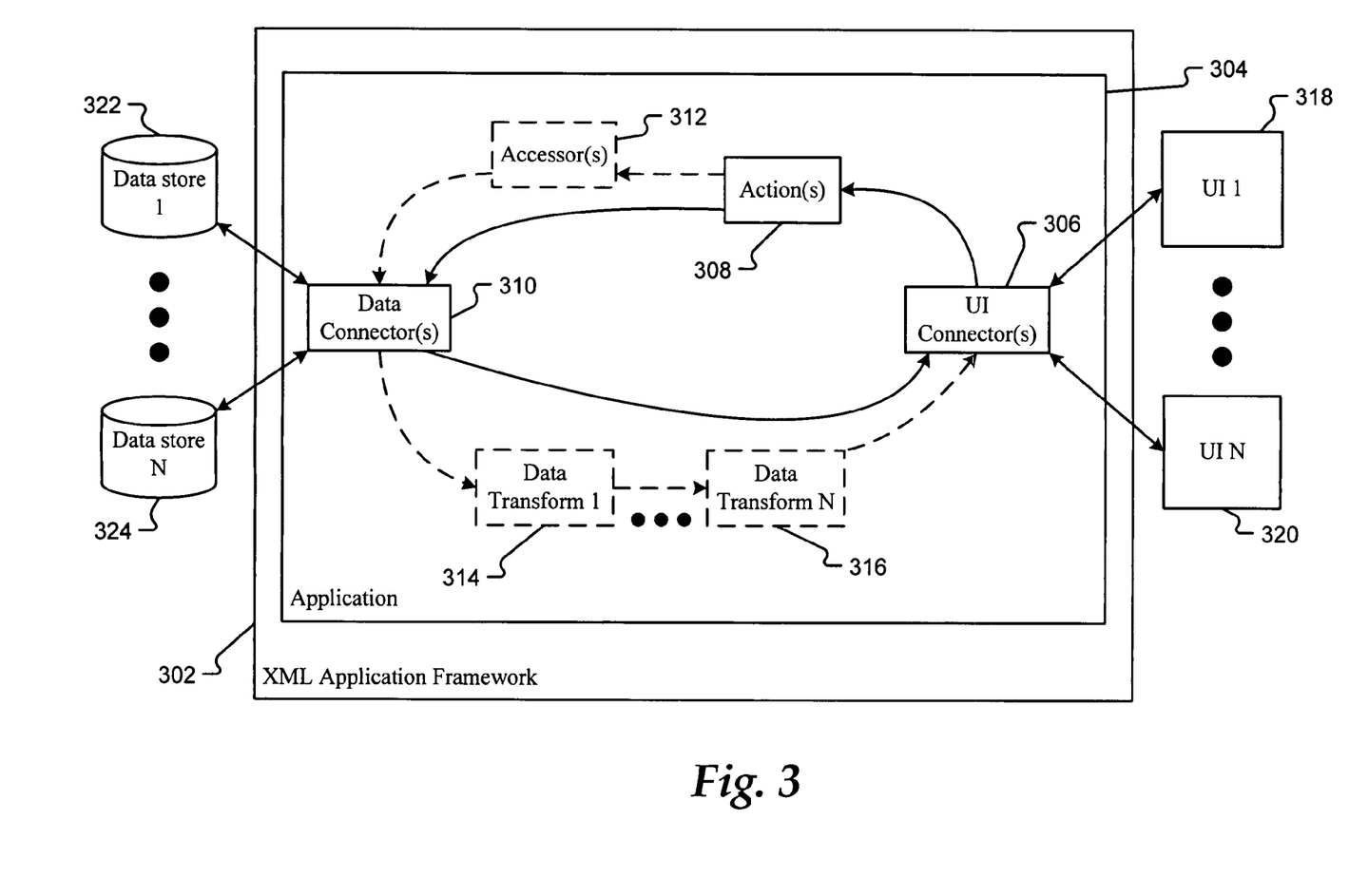
FIG. 3 is a functional diagram illustrating an exemplary embodiment of an XML Application Framework (XAF) application with application components connected to one or more UIs and one or more data stores in accordance with one embodiment of the present invention.

Embodiments of the invention may be implemented in an XML Application Framework (XAF) environment. The XAF framework allows creation and modification of applications as explained in related application Ser. No. 11/360,457, entitled "XML Application Framework" said application having been assigned to Microsoft® Corporation and incorporated by reference herein in its entirety. FIG. 3 is a functional diagram illustrating an exemplary embodiment of an XAF application with application components connected to one or more UIs and one or more data stores according to the present invention.

An exemplary XML Application Framework (XAF) 302 is shown in FIG. 3. XAF 302 operates to construct and manage the execution of applications, such as application 304. An application 304 executed within XAF 302 comprises one or more UI connectors 306, one or more actions 308, and one or more data connectors 310. In some embodiments, application 304 also comprises one or more accessors 312, or one or more data transforms 314 and/or 316. The components within application 304 operate to transform UI events into data changes and data changes into UI events. As such, UI connectors 306 are coupled to one or more UIs 318 and/or 320. In addition, data connectors 310 are coupled to one or more data stores 322 and/or 324. Within XAF 302, the data events or data representations in application 304 are in a standard format. For example, the data events and data representations are in XML.

UI connectors 306 provide the connection between application 304 and one or more UIs 318 and/or 320. In one embodiment, UIs 318 and/or 320 are graphical user interface that display information to the user. The graphical user interface may be a windows system, such as Microsoft® Windows® operating system. UI connectors 306 present and support the ability for the application user to edit data within XAF 302. A UI connector 306 maps data between the XAF data layer (represented by data connectors 310, data transforms 314 and 316 and data stores 322 and/or 324) and a specific UI 318 and/or 320. In addition, UI connectors 306 map UI events from UIs 318 and/or 320 into data editing operations within data connector 310.

UI connector 306 is specific to the type of UI element in UI 318 and/or 320. Thus, for every UI representation of an item of data within UI 318 and/or 320, there is a corresponding UI connector 306. In one example, a data element, such as a cell value within a spreadsheet, displayed in UI 318 and/or 320 will have a specific UI connector 306, coupled to the data element, which translates a user modification to the data element into a UI event and maps to an action 308. Thus, UI connectors 306 translate specific UI events into XAF actions 308 that are generically represented within XAF application 304. In one embodiment, all data changes within application 304 are represented as XML data changes. In another example, a user may operate a user interface control, such as a scroll bar. A change in the scroll bar creates a change in the state of UI 318 and/or 320. A UI state change may also be represented as a change in data. Thus, a UI connector 306 can receive a UI event, e.g. the scroll bar operation, and translate the UI event into an XML data change event for the XAF data layer.

UI connector 306 translates/maps a UI event to an action 308. Action 308 is a declarative statement for a data change in the XAF data layer. For example, user operation of the scroll bar can create a "click on the scroll bar" event. UI connector 306 translates this UI event and maps it to an action 308, such as "increment scroll bar down one position." In one embodiment, the data change action is represented in XML.

Data connectors 310 marshal data to and from external data stores 322 and/or 324. Similar to UI connectors 306, data connectors 310 translate between internal XAF data representations and external data types in the different data stores 322 and/or 324. Thus, there are data-specific data connectors 310 for each type of external data. Data connectors 310 receive the actions 308 and translate the standard format XAF data action 308 into a data store-specific action to affect the data within the data stores 322 and/or 324. In one embodiment, data connector 310 translates an XML data action into a data store-specific action. For example, the scroll bar operation represented by a standard format XML statement is translated into an interface state-specific data change and sent to the data store 322 or 324 storing the specific interface state data.

In addition, data connectors 310 translate changes in data stores 322 and/or 324 into standard format XAF data representations that are sent to UI connectors 306. UI connectors 306 translate the standard format XAF data representations into UI events that are sent to UIs 318 and/or 320. Thus, for any change within UI 318 and/or 320, UI connector 306 translates/maps the user interface event into an action 308. Action 308 is sent to a data connector 310 that translates the action 308 into a data-specific change within data connector 310. Once the data is changed, data connector 310 translates the changed data in the data store 322 and/or 324 into a standard format XAF data representation. Data connector 310 sends the XAF data representation back to UI connector 306, which translates the XAF data representation into a UI-specific display event. UI connector 306 sends the UI-specific display event to UI 318 and/or 320 for display, where UI 318 and/or 320 displays the changed data created from the UI event.

Application 304 can continue to process these cyclical changes between data and UI events for any and all actions occurring within the application 304. In some embodiments, changes in data within data stores 322 and/or 324 also force changes in UIs 318 and/or 320 without the occurrence of a user event, i.e., an event where the user modifies or changes a data element. Such is the case where a data change is forced from another operation outside of the user's control.

Some optional components within application 304 may include accessors 312 and data transforms 314 and/or 316. Accessors 312 allow for data-client-side mapping of data types used in the data connectors 310 and transforms 314 and 316 to or from data types useful for data clients. To access data of a certain type in a certain data store 322 and/or 324, an action 308 can specify an accessor 312 or "access model" to use for the data. Accessor 312 allows an application 304 to access specific types of data that are not homogenous, such as JPEG, MPEG, etc. Thus, regardless of the type of data within a data store 322 and/or 324 as compared with the type of data useful to the data clients, application 304 may interface and change that data. Accessors 312 ensure that data connectors 310 can manage any type of data including data types that are not yet devised or developed. In another embodiment, data clients may register further accessor types and the data connectors 310 and transforms 314 and 316 need not be aware of those types.

In other embodiments, one or more data transforms 314 and/or 316 mediate between data connectors 310 and UI connectors 306. A data transform 314 and/or 316 changes the data output from the data connector 310 into a UI-customized format required by the UI connector 306 for display. For example, if a UI connector 306 requires data in a list, data transform 314 and/or 316 may modify tabular data through one or more simple changes, each simple change performed by a single data transform 314 and/or 316, into a list of data. Thus, any form of data output by data connector 310 can be transformed through one or more canonical data transforms 314 and/or 316 into a form acceptable to and usable by the UI connector 306. The data connectors and transforms may introduce new data types. Such extended types are useful to downstream transforms built with an awareness of these new data types.

Figure 4:
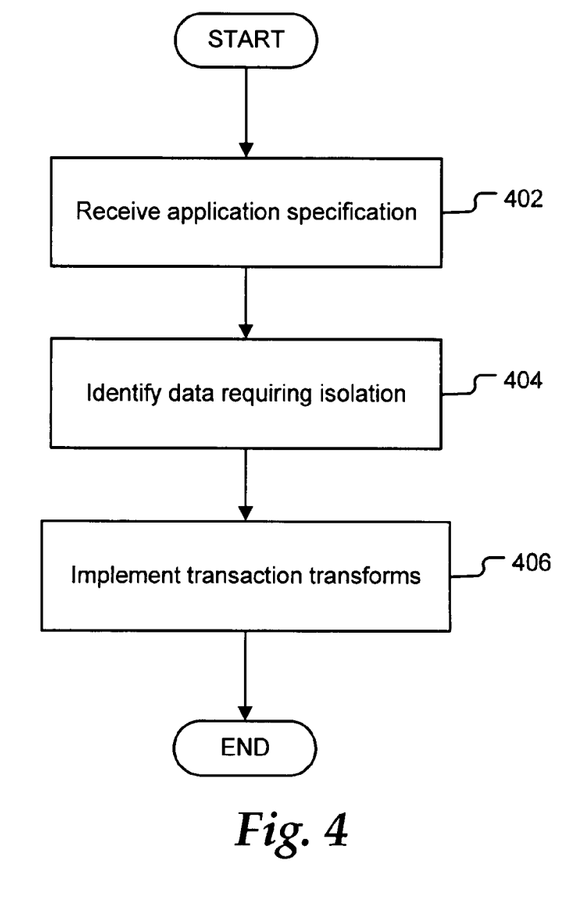
FIG. 4 illustrates the operational flow of the operations performed in one embodiment of the present invention.

In response to the receipt of an application specification from an application developer, an embodiment of the present invention identifies which parts of the application require isolated data and implements transaction transforms as required. FIG. 4 illustrates the operational flow of these operations.

Receive operation 402 receives an application specification. In one embodiment, the application specification specifies an XAF application, including which data should be isolated, and identify operation 404 identifies and marks the corresponding data entities within the application that will be isolated.

Implement operation 406 implements one or more transaction transforms corresponding to each data entity that is marked as a data entity to be isolated. Transaction transforms are then connected and activated in substantially the same way as a data transform.

Figure 5:
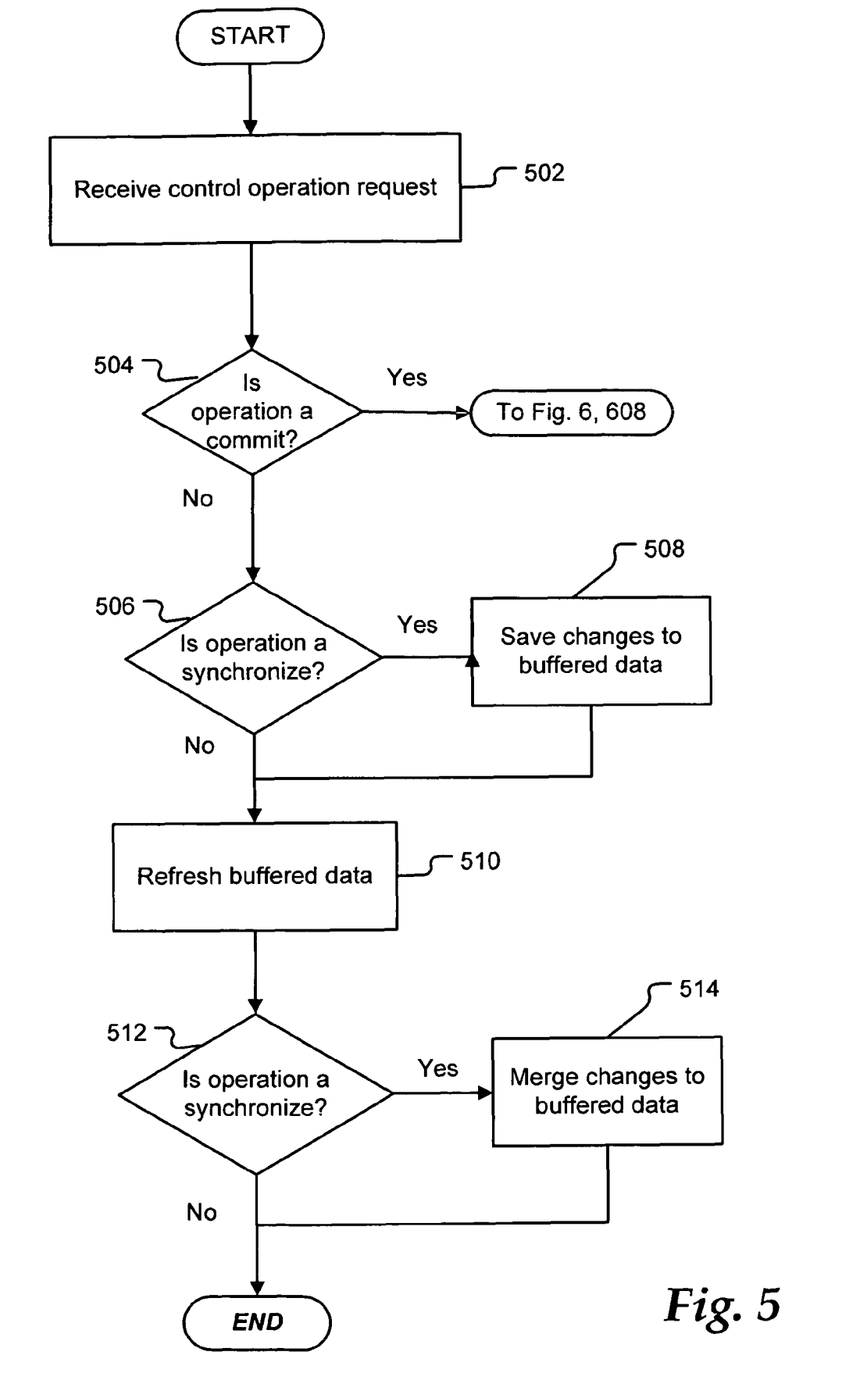
FIG. 5 illustrates the operational flow of the operations performed in one embodiment of the present invention.
Figure 6:
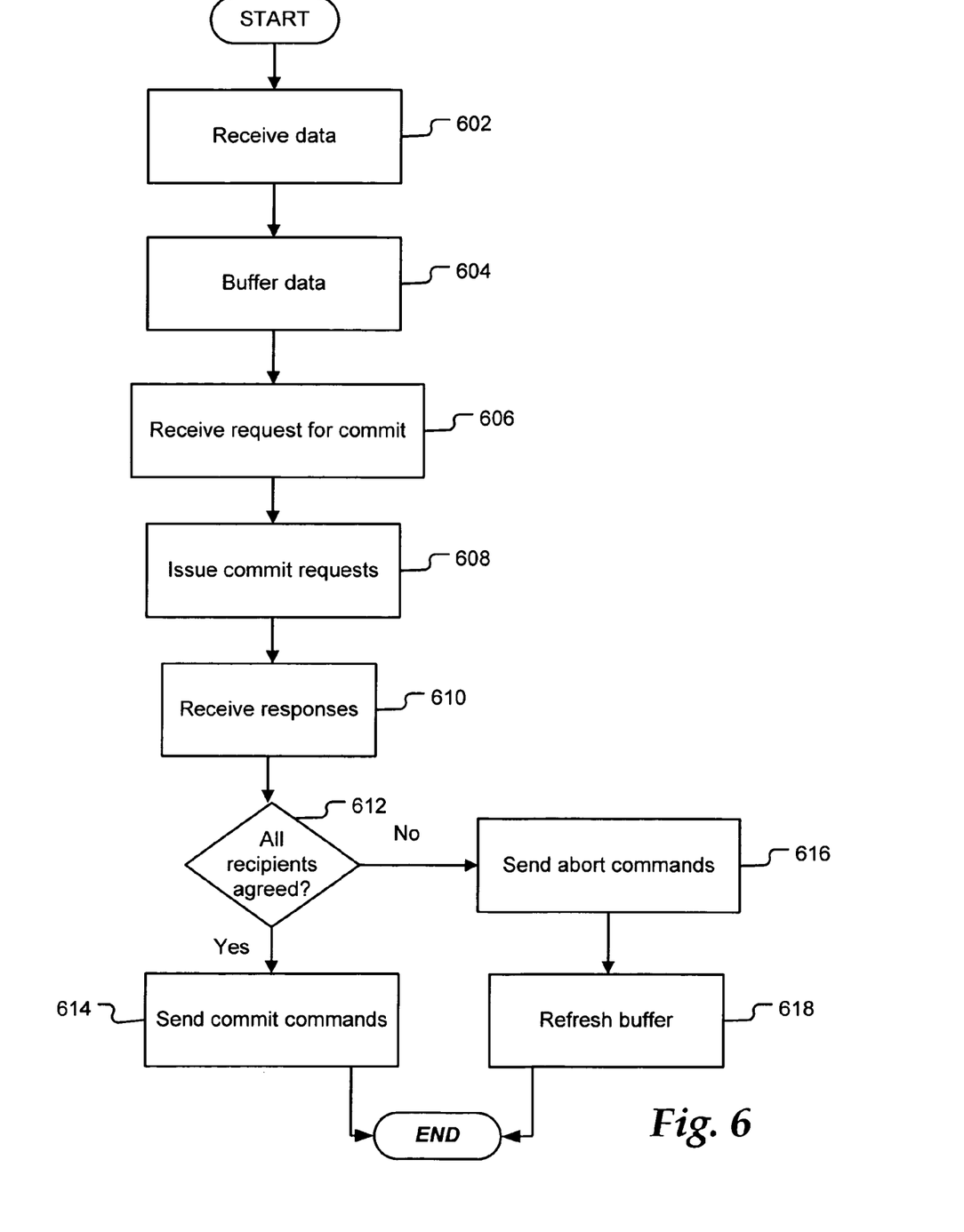
FIG. 6 illustrates the operational flow of the operations performed in one embodiment of the present invention.

FIG. 5 illustrates how control operations are performed in accordance with one embodiment of the present invention. Receive operation 502 receives a control operation request from a data client. In an embodiment, the request is triggered by a user clicking on a UI control associated with the data client. Determine operation determines whether the control operation request is requesting a commit operation. If the control operation request is for a commit operation, flow branches YES to issue operation 608 (FIG. 6). If the control operation request is not for a commit operation, flow branches NO to determine operation 506.

Determine operation 506 determines whether the control operation request is requesting a synchronize operation. If the control operation request is for a synchronize operation, flow branches YES to save operation 508. If the control operation request is not for a synchronize operation, flow branches NO to refresh operation 510.

If a synchronize operation was requested, save operation 508 saves any uncommitted changes to the buffered data. The uncommitted changes may be saved to a file on a computer-readable medium, to volatile or non-volatile memory, or other form of computer storage, or committed to an external database or similar service. Flow then proceeds to refresh operation 510.

Refresh operation 510 retrieves the latest copy of the buffered data that exists in the data stores, and places it in the buffer associated with the transaction transform. Refresh operation 510 may need to query several data stores to determine which data store contains the most up-to-date copy of the data. In another embodiment, refresh operation 510 may alternatively or additionally check the data connector associated with each data store to see if the data connector contains a cached copy of the buffered data.

Determine operation 512 determines whether the control operation request is requesting a synchronize operation. In an embodiment, determine operation 512 simply checks the results of determine operation 506. If the control operation request is for a synchronize operation, flow branches YES to merge operation 514. If the control operation request is not for a synchronize operation, flow branches NO to the end of the operational flow.

If a synchronize operation was requested, merge operation 514 merges the changes to the buffered data that were saved by save operation 508 with the buffered data refreshed by refresh operation 510. The rules for merging two versions of a body of data vary based on the context of the application. Some exemplary rules are presented in conjunction with FIG. 1. In an embodiment, a plurality of changes from different data clients may be merged together to achieve synchronicity in each of the data clients.

FIG. 6 illustrates how commit requests are processed in accordance with one embodiment of the present invention. Receive operation 602 receives data from a data client. In one embodiment, the data client is a dialog box through which an application user entered data, and the data is transmitted when a UI control associated with the dialog box is activated. Buffer operation 604 then buffers the data within, or in memory associated with, one or more transaction transforms.

When receive operation 606 receives a request for a commit operation, a modified two-phase commit protocol is invoked. First, issue operation 608 issues commit requests to a plurality of data connectors associated with data stores. In an embodiment, a commit request includes the data to be committed. The commit requests are received by one or more data connectors that have cached the data, and/or one or more data stores that hold the data, and are treated as a request for assurance that the data can be atomically committed. Receive operation 610 receives responses from the data connectors and/or the data stores that hold the data. Once all the responses have been received, determine operation 612 determines whether all the recipients of the commit request agreed to the commit. If all the recipients agreed, flow branches YES to send operation 614. If not all the recipients agreed, flow branches NO to send operation 616.

If all the recipients agreed to commit the data, send operation 614 sends commit commands to the all the recipients of commit requests issued by issue operation 608. The recipients commit the data (that is, update their own data with the changes).

If not all of the recipients agreed to commit the data, send operation 616 sends abort commands to the recipients. The recipients are thus made aware that the proposed commit will not take place, and that any data associated with the commit may be discarded. In an embodiment, send operation 616 only sends abort commands to the recipients that agreed to commit the data, while the recipients that did not agree to commit the data automatically discard the data without being explicitly ordered to. Next, refresh operation 618 executes a refresh control operation to refresh the buffered data. In an embodiment, refresh operation 618 instead executes a synchronize control operation to synchronize the buffered data.

Other embodiments of the present invention are also envisioned. In one embodiment, each transaction transform may include a policy module that enforces synchronization rules. In another embodiment, the policy module sets the concurrency policy for refreshing and synchronization. Exemplary concurrency policies include conservative concurrency (wherein a complete copy of all buffered data is always made), and optimistic concurrency (wherein data is copied into the buffer only as needed). A policy module may also allow for modular addition of policy to handle other types of control operations not discussed herein.

In another embodiment, transaction transforms can be used to access and manipulate data in conjunction with a query language. SQL (Structured Query Language) is one such query language that is in wide use. XQuery is another such query language. The use of other query languages in conjunction with the present invention is also envisioned.

In yet another embodiment, the data connectors 310 may contribute and, to some extent, manage the parts of the buffer, e.g., buffer and logic 116 in FIG. 1. In such a case, the connector has logic to access and/or manipulate the buffered data to control refreshing and/or synchronization components of the data.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer readable storage device having a set of instructions which when executed perform a method for constructing an application capable of localized data isolation, the method executed by the set of instructions comprising:

receiving an application specification in an Extensible Markup Language (XML) application framework (XAF) environment, the XAF environment being operatively associated with a plurality of user interface (UI) connectors and a plurality of data stores through data connectors, each data store having a particular data type configured to communicate at a corresponding protocol implemented by the data connectors, the user interface connectors being employed to translate UI actions into XAF actions, the data connectors being employed to translate the XAF actions into data store specific actions and the data store specific actions into the XAF actions in accordance with the corresponding protocol associated with each data store;

identifying data entities requiring isolation;

receiving at least one data change in a user interface for the application;

translating, by a UI connector, the at least one data change in the user interface into a generic XAF event, wherein translating, by the user interface connector, the at least one data change in the user interface comprises employing the user interface connector that is specific to a type of user interface element associated with the at least one data change in the user interface; and implementing, at least in part by a data connector, at least one transaction transform, the at least one transaction transform being capable of performing a control operation on the at least one data change, wherein performing the control operation comprises:

requesting assurance that the control operation can be performed, receiving a response to the assurance request, determining whether the received response comprises an affirmative assurance that the control operation can be performed, and sending a command to complete with the control operation;

a buffer module for storing buffered data and maintaining status information relating to the buffered data and the control operations, wherein the buffer module is configured to retain buffered data in response to determining that the received response does not comprise the affirmative assurance that the control operations can be performed.

2. A computer readable storage medium as defined in claim 1, further comprising using a phase and domain constraint model to preserve order of operations.

3. A computer readable storage medium as defined in claim 1, further comprising selecting a particular coherency protocol for each of the at least one transaction transforms.

4. A computer readable storage medium as defined in claim 1, furthering comprising allowing a plurality of transaction transforms to be interspersed with a plurality of data transforms.

5. A computer readable storage medium as defined in claim 4, further comprising storing results of at least one data transformation within a transaction transform.

6. A system for data isolation in an application, the system comprising:

a memory storage; and a processing unit coupled to the memory storage, wherein the processing unit is configured to:

receive an application specification in an Extensible Markup Language (XML) application framework (XAF) environment, wherein the XAF environment is in communication with a plurality of user interface (UI) connectors and a plurality of data stores through data connectors configured to atomically commit data modifications, each data store having a particular data type configured to communicate at a corresponding protocol implemented by the data connectors, wherein the user interface connectors are operative to translate user interface events into XAF events and wherein the data connectors are operative to translate the XAF events into data store specific events and data store specific events into XAF events in accordance to the corresponding protocol associated with each data store, receive at least one change to a user interface element, translate the at least one change to the user interface element to an application-specific action, wherein the processing unit being configured to translate the at least one change to the user interface element to the application-specific action comprises the processing unit being configured to employ at least one user interface connector to translate the at least one change to the user interface element, the at least one user interface connector being specific to the changed user interface element, store the application-specific action as interface state data, identify data entities requiring isolation, implement at least one transaction transform and at least one data transform for performing the control operations, wherein results of the at least one data transform are stored within the transaction transform, preserve order of operations using a phase and domain constraint model, request assurance that the control operations can be performed, receive a response to the assurance request, determine whether the received response comprises an affirmative assurance that the control operations can be performed, and in response to determining that the received response comprises an affirmative assurance that the control operations can be performed, send a command to complete with the control operations; and a buffer module for storing buffered data and maintaining status information relating to the buffered data and the control operations, wherein the buffer module is configured to retain buffered data in response to determining that the received response does not comprise the affirmative assurance that the control operations can be performed.

7. A system as defined in claim 6, further comprising a data transform module for performing data transformations.

8. A system as defined in claim 6, further comprising a policy module for controlling at least one control operation policy.

9. A computer implemented method for constructing an application capable of localized data isolation, the method comprising:

receiving an application specification in an Extensible Markup Language (XML) application framework (XAF) environment, the XAF environment being operatively associated with a plurality of user interface (UI) connectors and a plurality of data stores through data connectors, each data store having a particular data type configured to communicate at a corresponding protocol implemented by the data connectors, the user interface connectors being employed to translate UI actions into XAF actions, the data connectors being employed to translate the XAF actions into data store specific actions and the data store specific actions into the XAF actions in accordance with the corresponding protocol associated with each data store;

identifying data entities requiring isolation; receiving at least one data change in a user interface for the application; translating, by a UI connector, the at least one data change in the user interface into a generic XAF event, wherein translating, by the user interface connector, the at least one data change in the user interface comprises employing the user interface connector that is specific to a type of user interface element associated with the at least one data change in the user interface; and implementing, at least in part by a data connector, at least one transaction transform, the at least one transaction transform being capable of performing a control operation on the at least one data change, wherein performing the control operation comprises:

requesting assurance that the control operation can be performed, receiving a response to the assurance request, determining whether the received response comprises an affirmative assurance that the control operation can be performed, and sending a command to complete with the control operation;

a buffer module for storing buffered data and maintaining status information relating to the buffered data and the control operations, wherein the buffer module is configured to retain buffered data in response to determining that the received response does not comprise the affirmative assurance that the control operations can be performed.

10. A method as defined in claim 9, further comprising using a phase and domain constraint model to preserve order of operations.

11. A method as defined in claim 9, further comprising selecting a particular coherency protocol for each of the at least one transaction transforms.

12. A method as defined in claim 9, furthering comprising allowing a plurality of transaction transforms to be interspersed with a plurality of data transforms.

13. A method as defined in claim 12, further comprising storing results of at least one data transformation within a transaction transform.

* * * * *